United States Patent [19]

Paffenholz

[11] Patent Number: 5,793,702
[45] Date of Patent: Aug. 11, 1998

[54] METHOD FOR MEASURING THE WATER BOTTOM REFLECTIVITY

[75] Inventor: Josef Paffenholz, Missouri City, Tex.

[73] Assignee: Western Atlas International, Inc., Houston, Tex.

[21] Appl. No.: 777,229

[22] Filed: Dec. 31, 1996

Related U.S. Application Data

[63] Continuation-in-part of Ser. No. 651,994, May 21, 1996.
[51] Int. Cl.$^6$ ..................................................... G01V 1/38
[52] U.S. Cl. ................................. 367/24; 367/21
[58] Field of Search ........................ 367/15, 21, 24

[56] References Cited

U.S. PATENT DOCUMENTS

| | | | |
|---|---|---|---|
| 4,486,865 | 12/1984 | Ruehle | 367/24 |
| 4,796,238 | 1/1989 | Bourgeois et al. | 367/87 |
| 5,365,492 | 11/1994 | Dragoset, Jr. | 367/21 |
| 5,396,472 | 3/1995 | Paffenholz | 367/24 |
| 5,524,100 | 6/1996 | Paffenholz | 367/24 |

OTHER PUBLICATIONS

Encyclopedia Dictionary of Exploration Geophysics, Second Edition; Compiled by Robert E. Sheriff; Society of Exploration Geophsicists, 1984; p. 217.

Primary Examiner—Ian J. Lobo
Attorney, Agent, or Firm—William A. Knox

[57] ABSTRACT

The two-way water-layer travel time, $\tau$, is derived from duel-mode seismic sensor data by cross-correlating the Fourier transforms of the sum and difference of the velocity and pressure signatures. The Z-transform of $\tau$ evaluates one of the two Backus variables, $Z_w$. The second variable is $R_b$, the water bottom reflectivity coefficient. The frequency-domain transforms of the above summed and differenced signatures are each multiplied by the Backus operator $(1+R_b Z_w)^2$ after initializing $R_b$ and the products are iteratively cross-correlated until the correlation function converges to a minimum. $R_b$ is perturbed after each iteration. The value of $R_b$ upon convergence is the local water bottom reflectivity coefficient.

4 Claims, 1 Drawing Sheet

METHOD FOR MEASURING THE WATER BOTTOM REFLECTIVITY

RELATION TO OTHER APPLICATIONS

This is a continuation-in-part of U.S. patent application Ser. No. 08/651,994, filed May 21, 1996 in the name of Josef Paffenholz and assigned to the assignee of this invention.

BACKGROUND OF THE INVENTION

1. Field of the Invention

A method for measuring the sea-floor reflectivity coefficient from seismic reflection data gleaned from routine dual-sensor seismic data-acquisition operations using an ocean bottom cable.

2. Discussion of Relevant Art

In the art of seismic exploration, numbers of spaced-apart seismic sensors are distributed over a designated area of survey. In deep water, the sensors may be towed through the water in a streamer cable. In shallow water on the order of 150 meters deep or less and in the context of this disclosure as shown in FIG. 1, sensors such as $10_0, 10_1, 10_2, \ldots, 10_i$, (where i is the number of sensors deployed) may be laid directly on the sea floor 12 beneath a body of water 13. The sensors, $10_i$, are mechanically and electrically or optically interconnected by signal communication channels in a bottom cable 16. The cable and its included communication channels are further coupled to data-recording and processing equipment mounted aboard a seismic service ship such as 18 as is well known.

A sound source 20, which may be operated from a shooting ship 22, generates an acoustic wavefield 24 in the water at a succession of designated stations over the survey area. The source-station spacing is usually 25 to 50 meters, comparable to the spacing of the seismic sensors $10_i$ mounted on/in the bottom cable 16. The wavefield propagates radially in all directions to insonify sub-bottom earth layers (not shown in FIG. 1) whence the wavefield is reflected back towards the sea floor 12 where it is detected by the sensors $10_i$. The sensors convert the mechanical earth motions or water pressure variations, due to the reflected seismic wavefield, to amplitude-modulated electrical signals. The signals are recorded for archival storage and, perhaps, partially processed in ship-borne data-recording equipment following discretization, all of which functions are well known to the art. The recorded seismic data are processed to provide a representation of the topography of selected sub-sea strata using any well known data-processing sequence.

Sensors used in marine seismic exploration are usually pressure-sensitive hydrophones. For certain projects, particularly those using ocean-bottom cables, geophones that are responsive to particle velocity may be used in combination with the hydrophones in the form of dual-mode sensors.

For purposes of this disclosure, the term dual-mode means that sensors such as 26 and 28, FIG. 2 are of different genera but which are used jointly to register a common seismic wavefield. They may either be mounted together in a single case such as 29 or they may be separate packages that are laid intimately next to each other on the water bottom. In some instances, accelerometers may be substituted in place of or in combination with the hydrophones. Accelerometers are responsive to changes in particle velocity with respect to time.

Reference will be made to seismic signatures. For purposes of this disclosure, a seismic signature is defined as the variation in phase and amplitude, expressed in the time domain, of the signal level of a quantity under consideration such as water pressure or particle velocity. The unqualified term velocity means the velocity of propagation of an acoustic wavefield through a medium of interest. The term pressure signature refers to the pressure variation, usually in a fluid, due to the passage of a compressional wavefront. The term velocity signature refers to the variation in particle velocity in a medium due to the passage of a wavefront. Seismic signatures are displayed on time-scale traces where the trace excursion or variation in trace density is a measure of signal amplitude.

Seismic signals are usually contaminated by noise which may be random or coherent. Noise is defined as any unwanted signal such as the random noise of a ship's screw, marine-life conversations, wind noise or crashing of waves. Random noise of that type may be reduced by temporal or spatial filtering.

The acoustic wavefields are not only reflected from subsurface earth strata but may also be multiply-reflected between the sea floor 12 and the sea surface 14 such as ray path 30, FIG. 2 much like the multiple reflections as seen in the mirrors on opposite walls of a barber shop. Both the sea floor and the sea surface are efficient reflectors having a coefficient of reflection that may approach unity. Reflections from the water surface, also referred to as ghost reflections, may have a very high amplitude and often reside in the same part of the seismic spectrum as desired primary reflections. Multiple reflections of whatever type constitute a severe type of coherent noise that is not necessarily amenable to attenuation by temporal or spatial filtering. Interbed multiples from deep-seated strata such as 32 of FIG. 3, may further complicate matters.

This disclosure is concerned with measuring the ocean bottom reflectivity coefficient for the purpose of attenuating so-called first-order peg-leg multiples. According to R. E. Sheriff's Encyclopedic Dictionary of Exploration Geophysics, 1991 edition, a peg-leg multiple is defined as a multiple reflection involving successive reflection between different interfaces so that its travel path is non-symmetric. FIG. 3 shows various examples of possible multiple trajectories. The first, second and fourth trajectories are representative of first-order peg-leg multiples, involving surface (ghost) reflections, and which are amenable to treatment by the methods of this invention. The third trajectory represents an inter-bed multiple. The fourth trajectory also illustrates the effect of reverberation where the wavefield is initially trapped within the water layer.

Multiple reflections comprise a coherent noise field which somehow must be removed from seismic data. Multiple contamination is most troublesome in the presence of relatively flat-lying earth layers. Multiples cannot exist if the bedding planes of the respective strata exhibit significant dip on the order of 15° to 20° or more.

U.S. Pat. No. 5,365,492, issued Nov. 15, 1994, to William H. Dragoset, assigned to the assignee of this invention and incorporated herein by reference as a teaching of the anatomy of a ghost reflection, teaches a method for canceling ghost reflections. In that method, a geophone and a hydrophone are co-located so as to see both the pressure signature and the velocity signature characteristic of a particular seismic transient. The pressure signature is adaptively filtered and subtracted from the velocity signature to isolate a nearly pure noise signature. The noise signature is added back to the velocity signature with opposite sign to clear away the embedded random noise, leaving a refined velocity signature. The refined velocity signature is scaled and summed with the pressure signature from the hydrophone to cancel the coherent noise of the ghost reflection. The step of scaling requires an accurate knowledge of the water-bottom reflectivity, a quantity that is merely estimated in that reference.

A similar method is taught by W. H. Rhuele in U.S. Pat. No. 4,486,865 who reduces the ghost effect using dual-mode sensors. The output of one of the pair of sensors is gain-adjusted and filtered using a deconvolution operator having a preselected amount of white noise added to the zero lag of the autocorrelation function. The deconvolved gain-adjusted signal is added to the signal output from the other sensor to cancel the ghost.

U.S. Pat. No. 5,396,472, issued Mar. 7, 1995 to J. Paffenholz, assigned to the assignee of this invention, also incorporated herein by reference, teaches a dual-sensor method for determining the water-bottom reflectivity coefficient for use in abating seismic signal contamination from first-order peg-leg multiples. The method involves summing the pressure and velocity signals to determine only up-going energy. The up-going energy is transformed to the frequency domain and multiplied by an inverse Backus operator $(1+RZ)^2$. For a selected frequency, the total energy is minimized for incremental values of the water-bottom reflectivity coefficient, R, using an iterative optimization computer routine assuming a water depth Z.

It is the intent of this disclosure to provide a convenient method for determining the water bottom reflection coefficient and the water depth using the data derived from dual sensors.

SUMMARY OF THE INVENTION

This is a method for measuring the reflectivity coefficient, $R_b$, of an earth layer that defines the bottom of a water layer. The method uses routine seismic data from each of a plurality of seismic sensor stations. Each sensor station is equipped with a dual-mode seismic sensor for detecting velocity and pressure signatures which are formatted in the time-space domain. The velocity and pressure signatures are resolved into up-going and down-going wavetrains. The up-going and down-going wavetrains are transformed to the frequency/wave-number domain and iteratively cross correlated. The time lag that maximizes the cross-correlation function is selected as the two-way wavefield travel time through the water layer and is entered as a component of the $Z_w$ argument of a Backus operator $(1+R_bZ_w)^2$. The $R_b$ component is initialized with a value embraced by the inequality $-1<R_b<+1$. The initialized Backus operator is multiplied by the respective up-going and down-going transforms, whereupon the products are iteratively cross-correlated, discretely perturbing $R_b$ after each iteration. The final value for $R_b$, upon convergence to a minimum, is the reflectivity coefficient at the selected sensor station.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
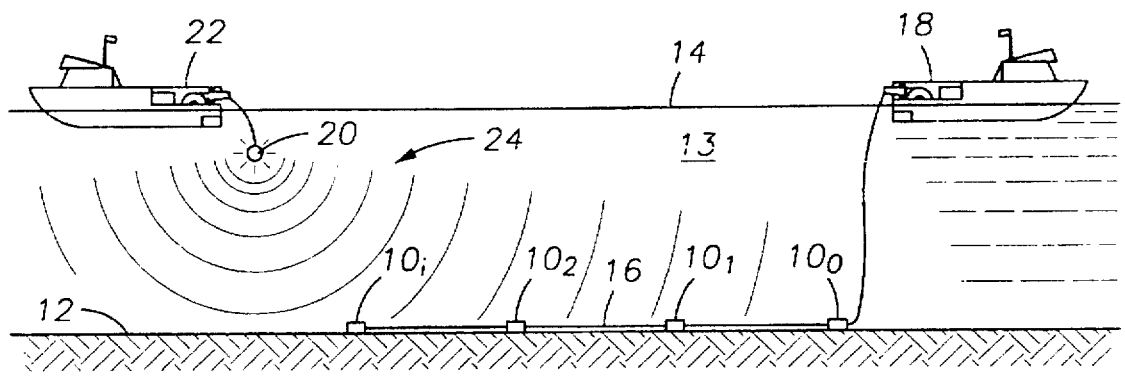
FIG. 1 is a schematic view of the manner of deployment of ocean bottom cables and dual mode sensors.
Figure 2:
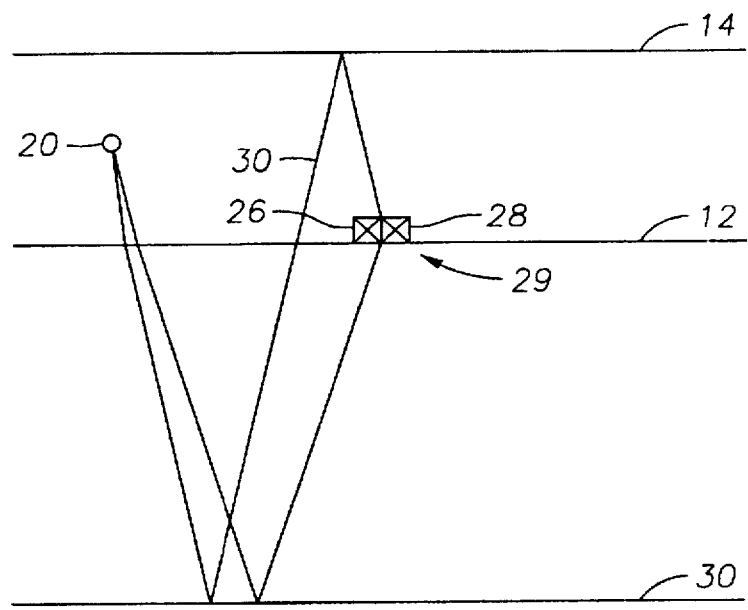
FIG. 2 show the trajectories of a ghost reflection and a primary reflection with respect to a dual mode sensor.
Figure 3:
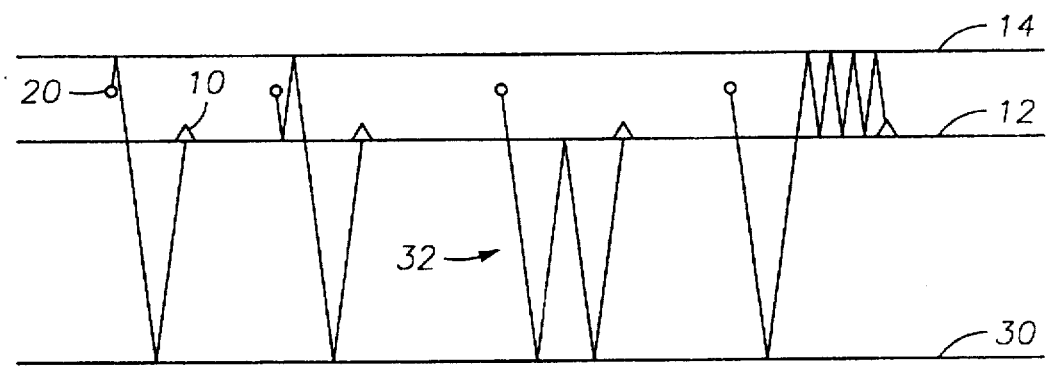
FIG. 3 illustrates several different first-order peg-leg multiple trajectories.

FIGS. 1-3 were discussed earlier but occasional reference hereinafter may be made thereto.

The theory of multiple reflections and various methods for attenuating same is thoroughly discussed in the '472 patent which, as before stated is incorporated herein by reference as a teaching of multiple-reflection technology. It was shown in that patent that first-order peg leg multiples may be successfully eliminated by application of the inverse Backus operator to the frequency-domain sum of the velocity and pressure signatures V and P, respectively in accordance with the steps:

SUM=V+P,

S(Z)=FFT (SUM), $S1(Z)=S(Z)\times(1+R_bZ_w)^2$.

$R_b$ is initialized to some value between $-0.8$ and $+0.8$. $Z_w$ is initialized by introduction of the water layer thickness, a quantity that is somehow obtained independently. The total power of quantity S1(Z) over a selected bandwidth is then iteratively computed, discretely perturbing $R_b$ after each iteration. The value of $R_b$ at minimum power is the local water bottom reflection coefficient. A drawback to that method is the need for getting the water depth from some independent source. Concomitantly, the computations are not very efficient.

In U.S. patent application Ser. No. 08/651,994, previously cited, and of which this application is a continuation-in-part, it was shown that the water depth can be derived by resolving the velocity and pressure signatures (V and P) received by a dual-mode sensor by summing V and P to isolate the up-going signal U=(V+P), and differencing V and P to sequester the down-going signal D=(V−P). U and D are transformed from the t-x domain to the f-k domain to provide the complex amplitude spectra UP(Z) and DN(Z) respectively. A time-delay operator $\tau$ is applied to UP(Z) which is then cross-correlated with DN(Z), discretely perturbing $\tau$ after each iteration. The lag time $\tau$ that maximizes the cross-correlation function is the two-way travel time in the water layer. The Z transform of $\tau$, $Z_w=e^{-i\omega\tau}$ may now be introduced into the inverse Backus operator $(1+R_bZ_w)^2$.

That method for measuring the water depth for use with the inverse Backus operator depends upon reception of the ghost reflection as shown by the ray paths of FIG. 2 and upon knowledge of the water-surface reflectivity coefficient which is near unity and, within the same environmental region, substantially a constant. Thus, one of the two Backus variables can be evaluated from the seismic-data harvest itself without recourse to independent foreign measurements.

As was shown in the '994 Patent Application, summation of the pressure and the velocity signatures isolates the up-going energy only, thus eliminating the receiver ghost. At sufficiently large travel times, it can be shown that the water-trapped reverberation has died off so that only the peg-leg reverberations described by the Backus operator $Bop=1/(1+R_bZ_w)^2$ remain. The peg-leg sequence can be eliminated if the up-going signature is multiplied by the inverse Backus operator $(1+R_bZ_w)^2$. In the '472 patent, the criterion to find the correct value for $R_b$, the other variable in the Backus operator, was to minimize the total power in the up-going signature after multiplication by the inverse Backus operator. Establishment of the minimal-power convergence limit is based on the premise that the contribution of the multiple reflections to the total spectral power is inversely proportional to multiple attenuation by the Backus operator. This invention offers a simpler, more direct approach to evaluating $R_b$.

It will be recalled that the Z transform of the two-way travel time in the water layer, $Z_w$, was determined with the aid of the up-going and down-going complex amplitude spectra UP(Z) and DN(Z). It can be shown that, given the correct value for $R_b$ and knowing $Z_w$ as previously determined, the first-order peg-leg multiples are eliminated on both the up-going and down-going wavefields. That can be recognized by a minimum in the zero-lag cross correlation between the up-going and the down-going energy after multiplication of the respective quantities UP(Z) and DN(Z) by the inverse Backus operator, $(1+R_b Z_w)^2$.

Thus, this invention offers a simple process for evaluating the Backus-operator variables, namely, the water-bottom reflectivity coefficient, $R_b$, and the Z transform $Z_w$ of the two-way water-layer travel time, $\tau$, solely from routinely-gathered seismic data harvested by the use of dual-mode seismic sensors.

The best mode of operation is best explained by the computer sub-routine program:

---

COMPUTATION OF REFLECTIVITY COEFFICIENT

---

```
FOR ALL SHOT RECORDS
    FOR ALL TRACES
        READ P SIGNATURE IN TIME WINDOW 0.8 < t < 2.0 SEC
        READ V SIGNATURE IN TIME WINDOW 0.8 < t < 2.0 SEC
        UP = (V + P)
        DN = (V - P)
        UP(Z) = FT (UP) (FOURIER TRANSFORM
        DN(Z) = FT (DN) (FOURIER TRANSFORM)
        DO τ = -∞, 0.0, 0.10 (MS)
            Ψ_MAX = Σ [UP(Z)_{t-1}] × [DN(Z)_t] (CROSS CORRELATE
                TRANSFORMS)
        END DO
        SELECT VALUE FOR τ WHICH MAXIMIZES Ψ_MAX
        AVERAGE VALUES OF τ FOR EACH RECEIVER; DISPLAY
        AVERAGE.
        Z_w ←→ e^{iwt}
        R_b = r (INITIALIZE R_b)
        DO r = -1, +1, 0.05
            UP1(Z_w) = UP(Z_w) × (1 + R_b Z_w)^2
            DN1(Z_w) = DN(Z_w) × (1 + R_b Z_w)^2
            Ψ_MIN = Σ [UP1(Z_w)_t] × [DN1(Z_w)_t]
            SELECT VALUE FOR R_b WHICH MINIMIZES THE ZERO
            LAG
            CROSS CORRELATION FUNCTION Ψ
        END DO
        DISPLAY R_b
    NEXT TRACE
NEXT SHOT RECORD
AVERAGE R_b VALUES FOR EACH RECEIVER
END.
```

This invention has been described with a certain degree of specificity by way of example but not by way of limitation. For example, the dual-mode sensors may be deployed from bouys and the data may be transmitted over ethereal communication channels instead of being hard-wired. Those skilled in the art will devise obvious variations to the examples given herein but which will fall within the scope and spirit of this invention which is limited only by the appended claims.

What is claimed is:

1. A method for measuring the reflectivity coefficient, $R_b$, of an earth layer that defines the bottom of a water layer, from observations, made at a plurality of seismic sensor stations, of seismic wavefields propagating within said water layer and reflected from earth layers therebeneath, comprising:

a) at a selected dual-mode sensor station, detecting the velocity signature, V, and the pressure signature, P, of a reflected seismic wavefield and formatting same as time-scale seismic traces;

b) resolving the pressure and velocity signatures into up-going and down-going wavetrains U and D respectively;

c) transforming U and D from the time domain to the frequency domain to provide respective complex amplitude spectra UP(Z) and DN(Z) derived from resolution of the velocity and pressure signatures;

d) iteratively cross-correlating the UP(Z) spectrum with the DN(Z) spectrum and selecting as a delay-time operator, $Z_w$, the lag time that maximizes the cross-correlation function;

e) introducing the delay time operator $Z_w$ into a Backus operator, $(1+R_b Z_w)^2$;

f) forming the products UP1(Z)=UP(Z)×$(1+R_b Z_w)^2$ and DN1(Z)=DN(Z)×$(1+R_b Z_w)^2$ after first initializing $R_b$ with a value embraced by the inequality $-1<R_b<+1$;

g) iteratively cross-correlating UP1(Z) with DN1(Z), discretely perturbing the $R_b$ component of the Backus operator after each iteration, until the cross-correlation function converges to a minimum;

h) upon convergence, designating the final value of $R_b$ as the local water-bottom reflection coefficient at the selected dual-mode sensor station.

2. The method as defined by claim 1, comprising:
   repeating steps a) through h) for all sensors at all dual-mode sensor stations.

3. The method as defined by claim 1, comprising:
   windowing the velocity and pressure signatures prior to the step of resolving.

4. The method as defined by claim 1, comprising:
   averaging the values for $R_b$ from a plurality of sensors within a preselected radius of each other.

* * * * *